United States Patent
Priepke et al.

(10) Patent No.: US 8,449,240 B2
(45) Date of Patent: May 28, 2013

(54) ROUND BALE LOADER FOR TRANSPORT FRAME

(75) Inventors: Edward H. Priepke, Lancaster, PA (US); Kevin M. Smith, Narvon, PA (US); John H. Posselius, Ephrata, PA (US)

(73) Assignee: CNH America LLC, New Holland, PA (US)

(*) Notice: Subject to any disclaimer, the term of this patent is extended or adjusted under 35 U.S.C. 154(b) by 177 days.

(21) Appl. No.: 12/903,627

(22) Filed: Oct. 13, 2010

(65) Prior Publication Data

US 2012/0093615 A1   Apr. 19, 2012

(51) Int. Cl.
*B66C 1/00* (2006.01)
*B66C 3/00* (2006.01)

(52) U.S. Cl.
USPC .......................................... 414/704; 414/729

(58) Field of Classification Search
USPC ................ 414/24.5, 729, 739, 740, 741, 699, 414/704
See application file for complete search history.

(56) References Cited

U.S. PATENT DOCUMENTS

| 17,043 | A | 4/1857 | Kennedy | |
|---|---|---|---|---|
| 1,900,569 | A | 3/1933 | Lederer | |
| 2,682,347 | A | 6/1954 | Jackson | |
| 3,583,586 | A | 6/1971 | Burton | |
| 4,286,917 | A * | 9/1981 | Mehesan, Jr. | 414/704 |
| 4,522,556 | A | 6/1985 | Shapiro | |
| 4,597,703 | A | 7/1986 | Bartolini | |
| 4,718,814 | A * | 1/1988 | Addleman | 414/705 |
| 5,647,721 | A * | 7/1997 | Rohrbaugh | 414/686 |
| 5,807,053 | A | 9/1998 | Pride | |
| 5,975,832 | A | 11/1999 | Winkler | |
| 6,312,205 | B1 | 11/2001 | Vandenberg | |
| 6,779,961 | B2 * | 8/2004 | Barney et al. | 414/728 |
| 7,093,383 | B2 * | 8/2006 | Mennen et al. | 37/348 |
| 2009/0191027 | A1 | 7/2009 | Garrett | |

FOREIGN PATENT DOCUMENTS

| FR | 002673422 A1 | 9/1992 |
|---|---|---|
| GB | 2048820 A | 12/1980 |
| GB | 0394011 A1 | 10/1990 |

* cited by examiner

*Primary Examiner* — Dean Kramer
*Assistant Examiner* — Stephen Vu
(74) *Attorney, Agent, or Firm* — Patrick Sheldrake; Rebecca Henkel (57) ABSTRACT

A work vehicle includes a telescoping boom extending outwardly from the vehicle. An attachment is operably connected to the boom, the attachment including opposed forks configured to be both urgable toward each other and urgable away from each other. The attachment is configured to be positionable over and substantially laterally surround at least one pair of round bales arranged substantially side by side and having corresponding diameters in close proximity of each other. The opposed forks are urgable toward each other with sufficient compressive force applied to opposed portions of the diameters of the at least one pair of round bales, at least elastically deforming the cylindrical profile of at least one of the at least one pair of round bales, so that the at least one pair of round bales can be vertically lifted and manipulated by at least the boom to a predetermined destination.

13 Claims, 9 Drawing Sheets

# ROUND BALE LOADER FOR TRANSPORT FRAME

FIELD OF THE INVENTION

The present invention relates generally to loaders for use with crop harvesting. It relates more particularly to a loader or loading system for loading bales onto or into a safe transport frame.

BACKGROUND OF THE INVENTION

Harvested crops, such as grass, alfalfa and other crops may be baled to permit large quantities of the crop to be transported and stored in a compacted arrangement for feed or other purposes. Round bales are often used, due to the low cost of storage and packaging equipment. However, there are disadvantages associated with loading and transporting round bales. First, the round cylindrical bales cannot be handled as conveniently as rectangular bales. Second, round bales do not stack as securely as rectangular bales in the loading process, requiring additional strapping to adequately secure round bales compared to rectangular bales. Finally, round bales loaded into a rectangular shaped load have a greater "void" area than a comparable load of rectangular bales, reducing the density or "packing factor" and net weight of the load.

What is needed is a loader or loading system that is configured to load round bales into a closable end of a transport frame of standard size, such as a trailer, commonly referred to as a semi trailer, in a manner that results in an increased packing factor.

SUMMARY OF THE INVENTION

The present invention relates to a fluid circuit associated with a telescoping boom of a work vehicle. The work vehicle includes a first control valve including at least a raising position, a neutral position and a lowering position, with one of the positions of the first control valve being selectably in fluid communication with a first side and a second side, the first side of the first control valve connectable to a source of pressurized fluid and to a reservoir. A second control valve is in fluid communication with the second side of the first control valve, the second control valve configured to retain the boom in a fixed position when the fluid circuit is not in a bypass mode. A third control valve is in fluid communication with the fluid circuit, the third control valve including at least a neutral position and a bypass position, with one of the positions of the third control valve being selectably in fluid communication with a third side and a fourth side. The third side of the third control valve is connectable to the second control valve and selectably connectable to the second side of the first control valve. The fourth side of the third control valve is selectably connectable to a first port and a second port of a fluid cylinder, the first port and the second port of the fluid cylinder being selectably connectable to the second side of the first control valve. An electrical circuit is selectably connectable with the third control valve to control the third control valve when the electrical circuit is closed. In response to the electrical circuit being closed and the first control valve being selectably urged to the lowering position, the third control valve is actuated to the bypass position, the fluid circuit being placed in the bypass mode. In the bypass mode, the reservoir and the first port and the second port of the fluid cylinder are in fluid communication via the bypass position of the third control valve, bypassing the second control valve, permitting the boom to be angularly lowered toward a surface.

The present invention further relates to a work vehicle including a telescoping boom extending outwardly from the vehicle. An attachment is operably connected to the boom, the attachment including opposed forks configured to be both urgable toward each other and urgable away from each other. The attachment is configured to be positionable over and substantially laterally surround at least one pair of round bales arranged substantially side by side and having corresponding diameters in close proximity of each other. The opposed forks are urgable toward each other with sufficient compressive force applied to opposed portions of the diameters of the at least one pair of round bales, at least elastically deforming the cylindrical profile of at least one of the at least one pair of round bales, so that the at least one pair of round bales can be vertically lifted and manipulated by at least the boom to a predetermined destination.

The present invention yet further relates to a method for using a work vehicle for loading bales. The method includes providing a telescoping boom extending outwardly from the vehicle; an attachment operably connected to the boom, the attachment including opposed forks configured to be both urgable toward each other and urgable away from each other. The method further includes positioning the attachment over at least one pair of round bales, the attachment to substantially laterally surround the at least one pair of round bales arranged substantially side by side and having corresponding diameters in close proximity of each other. The method further includes urging the opposed forks toward each other with sufficient compressive force applied to opposed portions of the diameters of the at least one pair of round bales to at least elastically deform the cylindrical profile of at least one of the at least one pair of round bales, the compressive force sufficient to permit the attachment to vertically raise the at least one pair of round bales. The method further includes manipulating the at least one pair of round bales by movement of at least the boom to deliver the at least one pair of round bales to a predetermined destination.

An advantage of the present invention is a loader or loading system that is configured to load round bales into a closable end of a transport frame of standard size in a manner that results in an increased packing factor.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
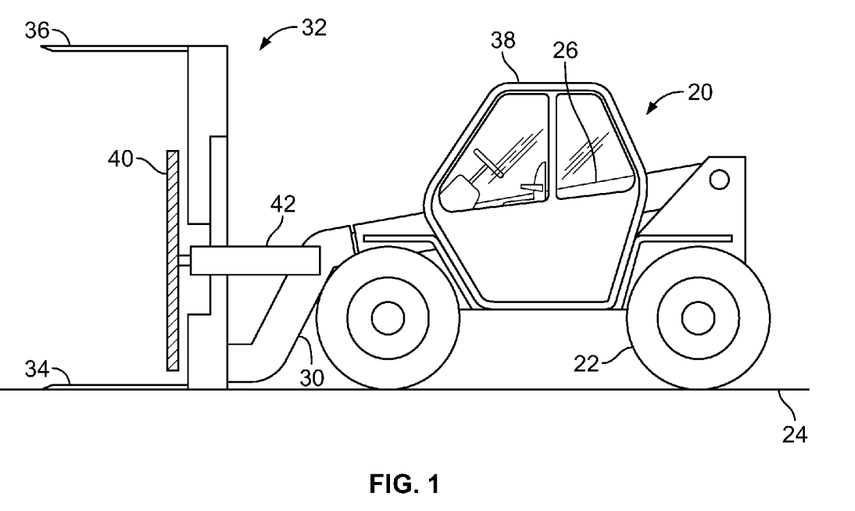
FIG. 1 is a side view of an embodiment of a work vehicle of the present invention.
Figure 2:
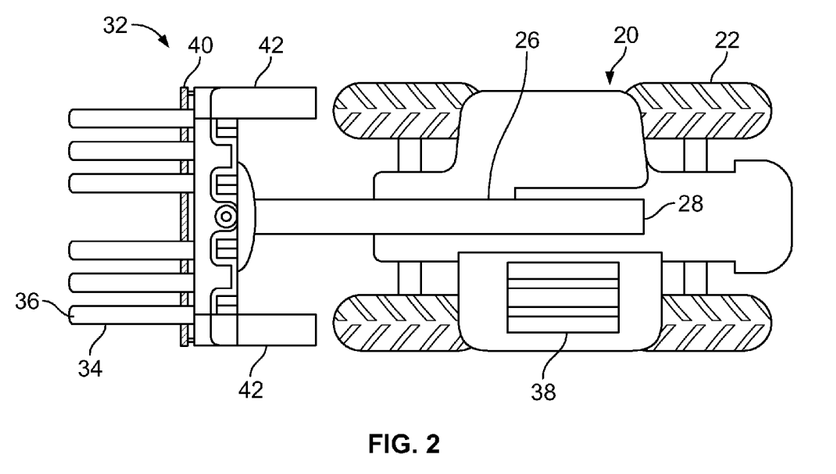
FIG. 2 is a plan view of an embodiment of a work vehicle of the present invention.

A work vehicle 20 is shown in FIGS. 1-2. Work vehicle 20 includes a frame that moves over the ground 24 such as with a track or wheels 22. Work vehicle 20 also includes a boom 26, such as a telescoping boom, including a base end 28 and an opposed end 30. As shown, a cab 38 is positioned to one side of the work vehicle, permitting boom 26 to the substantially centrally positioned with respect to the work vehicle, although in other embodiments the arrangement of components may be different. In one embodiment, base end 28 is pivotably connected to work vehicle 20, although in another embodiment, base and 28 may additionally include the capability for axial movement about its pivotable axis of rotation with respect to work vehicle 20. As shown in FIGS. 1-2, boom 26 can rotate an attachment 32 that is operatively connected to end 30 about base end 28. In other words, boom 26 can rotate end 30 and attachment 32 in a clockwise or counterclockwise movement with respect to work vehicle 20.

Figure 3:
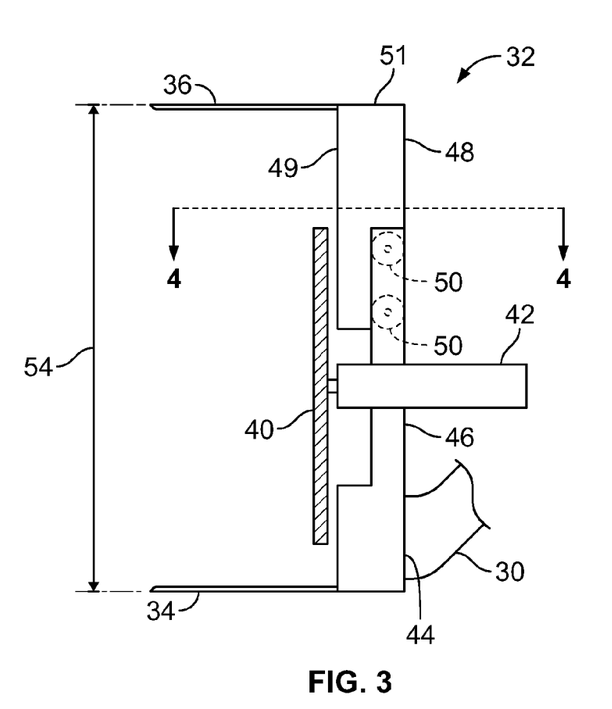
FIG. 3 is an enlarged side view of an attachment of the work vehicle shown in FIG. 1 with opposed forks in an extended spacing position with respect to each other and with a push-off device in a retracted position of the present invention.
Figure 4:
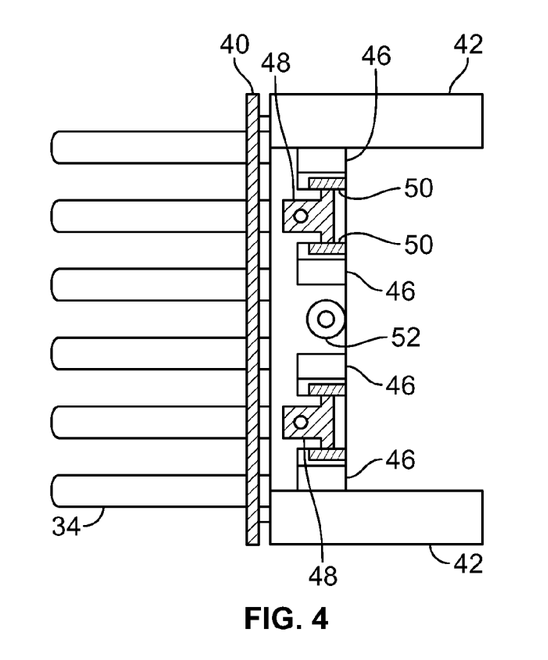
FIG. 4 is cross section taken along line 4-4 of FIG. 3 of the work vehicle of the present invention.
Figure 5:
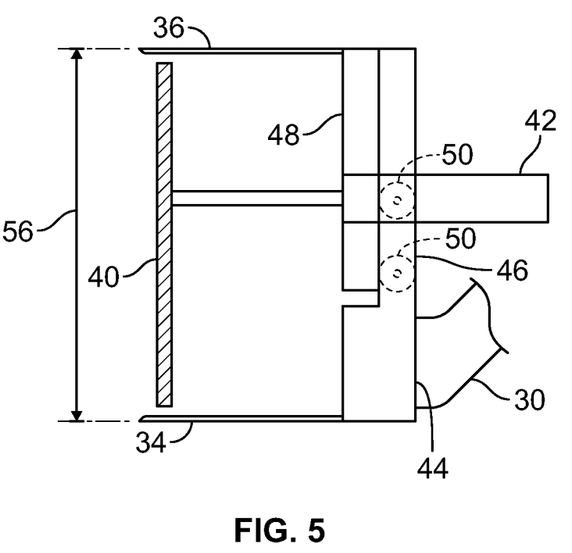
FIG. 5 is an enlarged side view of an attachment of the work vehicle shown with opposed forks in a retracted spacing position with respect to each other and with the push-off device in an extended position of the present invention.

As shown in FIGS. 3-5, a base frame 44 of attachment 32 is operably connected to end 30 of boom 26. In one embodiment, attachment 32 may be rotatably pivoted more than 90 degrees about a horizontal axis parallel to the ground associated with the connection to end 30 of the boom. In another embodiment, attachment 32 may be rotatably pivoted more than 90 degrees about multiple axes. In yet another embodiment, the connection between base frame 44 and end 30 may permit a translational movement, in addition to rotational movement of the attachment with respect to the boom. For example, the connection between base frame 44 and end 30 may permit an axial movement that is perpendicular to the direction of travel of the work vehicle.

A fixed set of forks 34 are secured to base frame 44 of attachment 32. Additionally, a pair of masts 46 extends outwardly from base frame 44 substantially perpendicular to forks 34. In one embodiment, and as shown in FIG. 4, each mast 46 resembles a C channel with a reinforcing member 47 spaced from and parallel to the base of the C channel and secured to the opposed walls of the C channel. The open end of each pair of masts 46 face each other to receive a pair of rollers 50 that are rotatably connected to a respective post 49 of a carrier 48. Posts 49 of carrier 48 opposite rollers 50 are secured to each other by an end member 51. End member 51 includes forks 36 that extend outwardly in a direction substantially perpendicular to carrier 48. As shown, forks 34 and forks 36 are substantially parallel to each other and although forks 34 are secured to base frame 44 and forks 36 are secured to end member 51 of carrier 48, a fluid cylinder 52 (FIG. 4), which permits movement of carrier 48 with respect to base frame 44, results in relative movement between forks 34 and forks 36. That is, by virtue of fluid cylinder 52, forks 36 may be urged toward forks 34 to achieve a retracted distance 56 (FIG. 5) with respect to each other, such as to secure an object such as a bale for manipulation by the work vehicle boom. Alternately, forks 36 may be urged away from forks 34 to achieve an extended distance 54 (FIG. 3) with respect to each other. That is, once the object has been transported, the forks may be urged away from each other, and a push-off device 40 that is operatively connected to a fluid cylinder 42 may be utilized to move the object from between the opposed forks 34, 36, if required.

Figure 6:
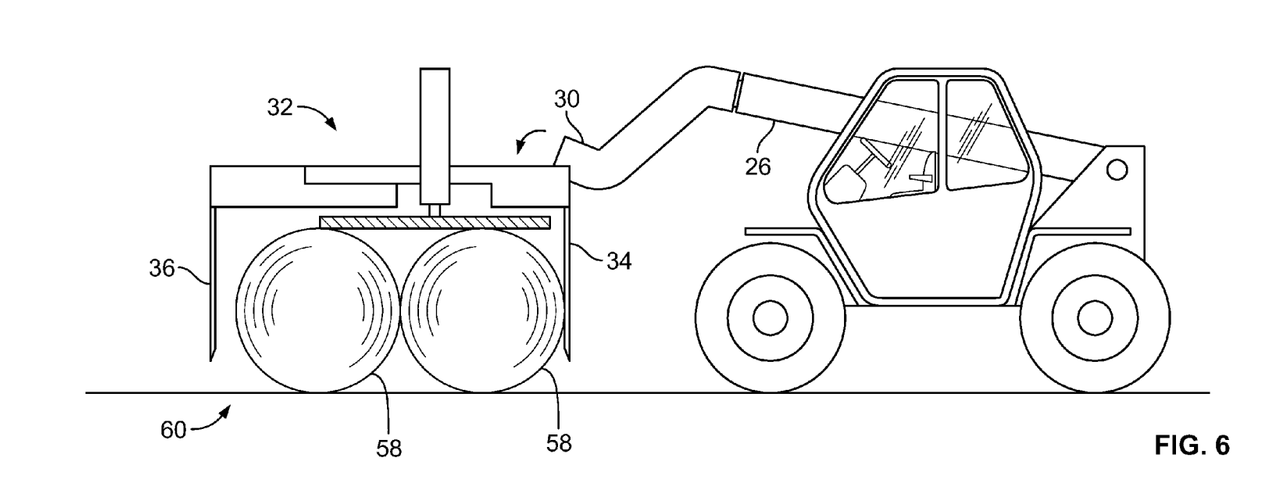
FIG. 6 shows the attachment positioned over and laterally surrounding at least a pair of round bales of the present invention.
Figure 7:
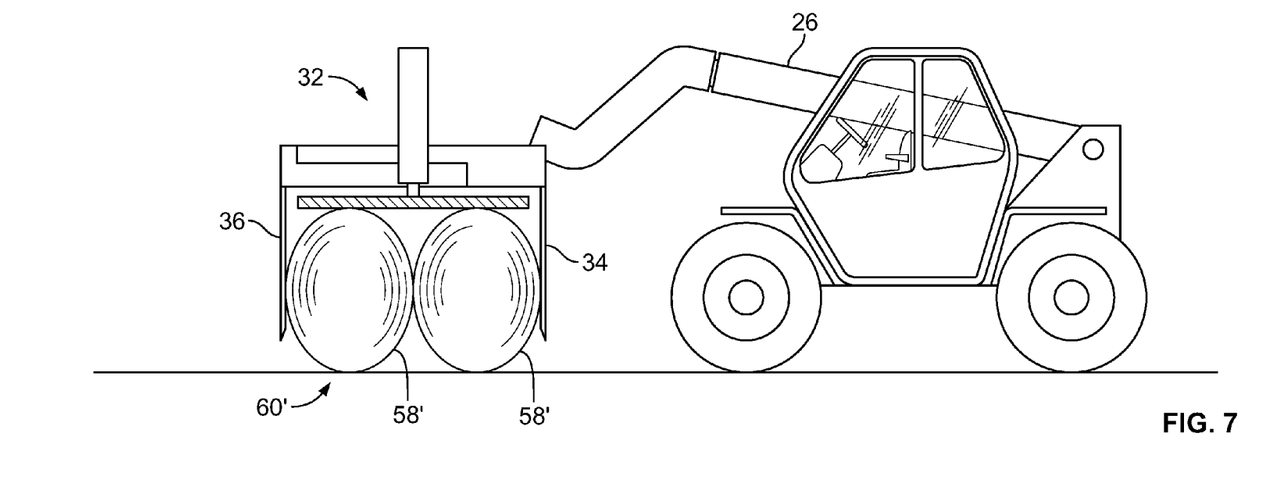
FIG. 7 shows the attachment of FIG. 5 applying a compressive force to the pair of bales of the present invention.
Figure 11:
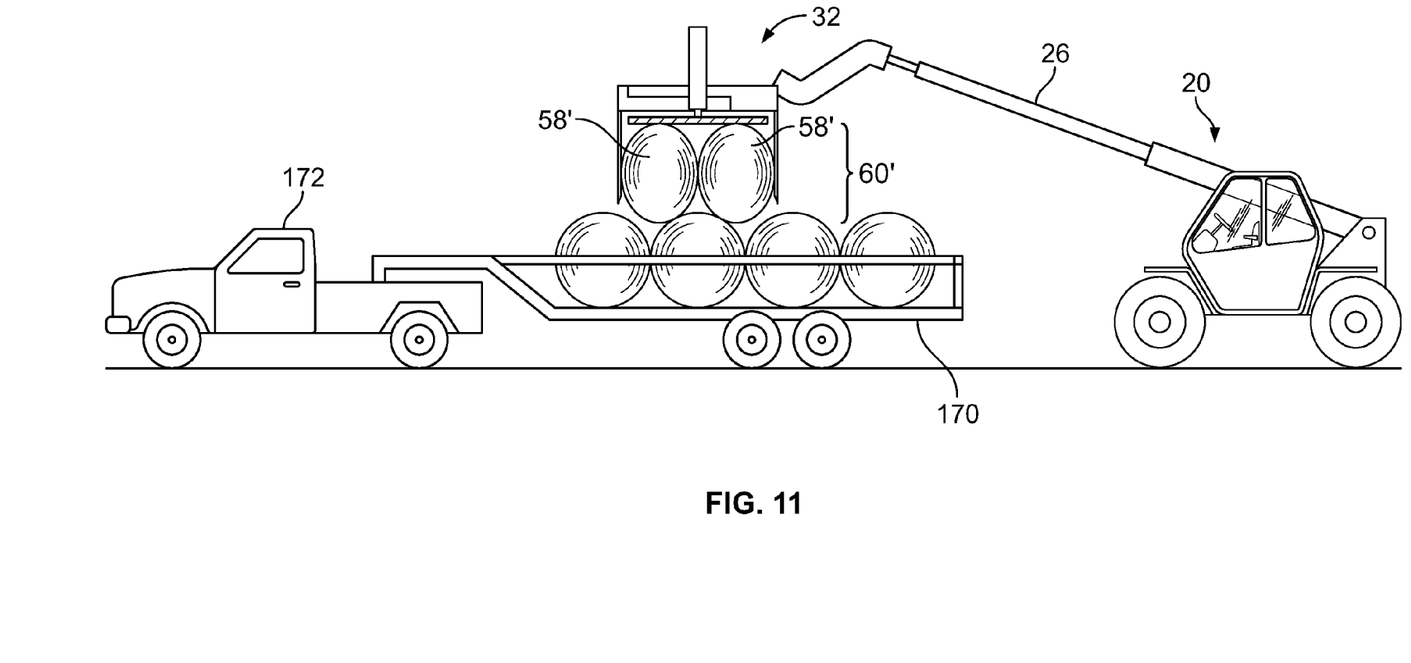
FIG. 11 shows the work vehicle attachment placing bales onto a transport frame of the present invention.

As shown in FIGS. 6-7, the associated components of attachment 32, including opposed forks 34, 36 may be utilized to be positioned over and at least partially laterally surround at least a pair 60 of round bales 58 in close proximity to each other. More specifically, at least one pair 60 of round bales 58 arranged substantially side by side and having corresponding diameters in close proximity of each other. In one embodiment, opposed forks 34, 36 may be utilized to be positioned over and at least partially laterally surround multiple pairs of round bales. Once positioned, the opposed forks 34, 36 may be urged toward each other and toward retracted distance 56 (FIG. 5) with sufficient compressive force applied to opposed portions of the diameters of the pair 60 of round bales, such that at least one bale 58 of the bale pair 60 is at least elastically deformed. Since elastically deformed is defined to mean that the shape of an object returns to its original shape (prior to application of a compressive force), the term at least elastically deformed also includes objects whose shape may not return its original shape, also referred to as inelastic or plastic deformation. Such deformation as applied to round bales refers to at least temporarily altering the cylindrical profile or cross section of at least at least one bale 58 of a bale pair 60, such as to an oval shape. For clarity, deformed or compressed bales will be referred to as 58', and deformed or compressed pairs of bales will be referred to as 60'. It is to be understood that for a given pair of round bales, due to the possibility of density difference therebetween, that any of one, both or neither bale of the pair of bales may undergo inelastic or plastic deformation as a result of being manipulated by attachment 32. Upon sufficient application of compressive force to bale pair 60', the bale pair can be vertically lifted and manipulated by at least the boom to a predetermined destination. That is, while it may be desirable in one instance to manipulate the bale pair 60' by immediate application of a vertical lift such as placing bales an open transport frame from a position above the transport frame 170 for movement by a work vehicle 172, such as a truck (FIG. 11), other manipulations such as a rotational or translational movement of attachment 32 with respect to boom 26 or some combination may also be utilized.

Figure 8:
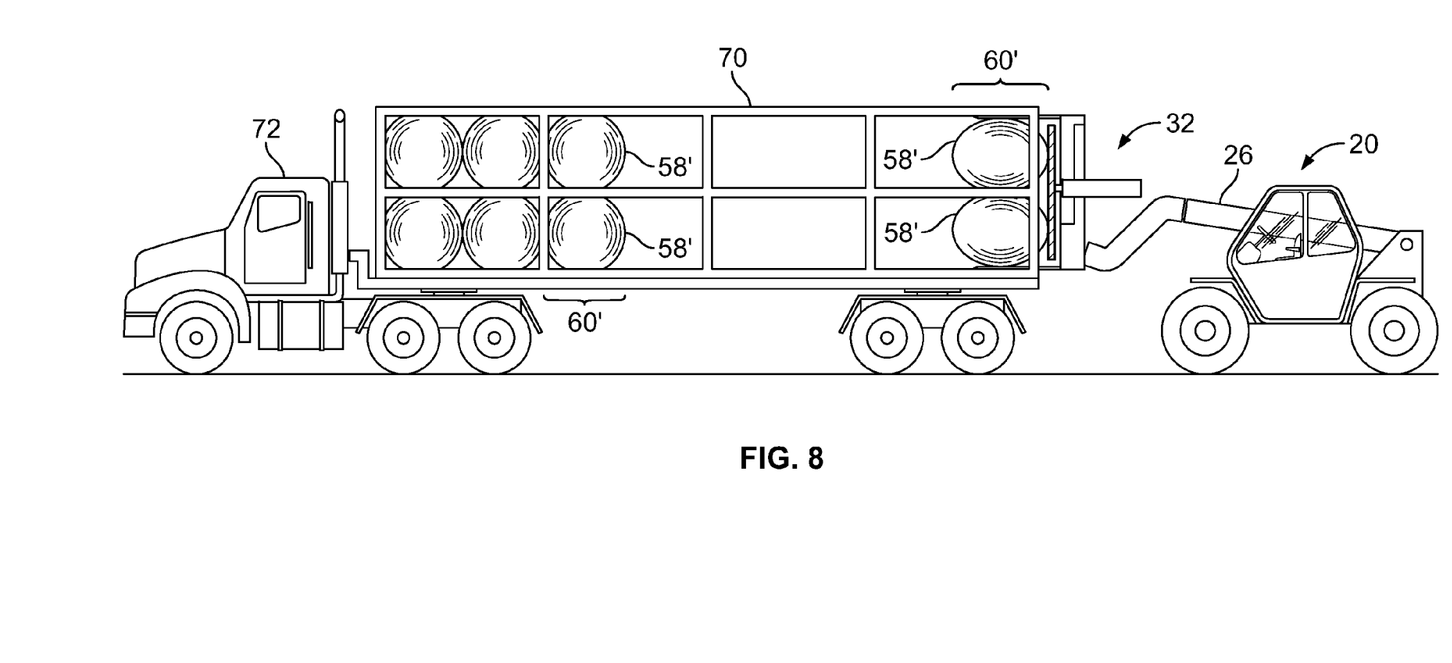
FIGS. 8-10 show the work vehicle attachment inserting bales into a transport frame (shown in cutaway view) of the present invention.
Figure 9:
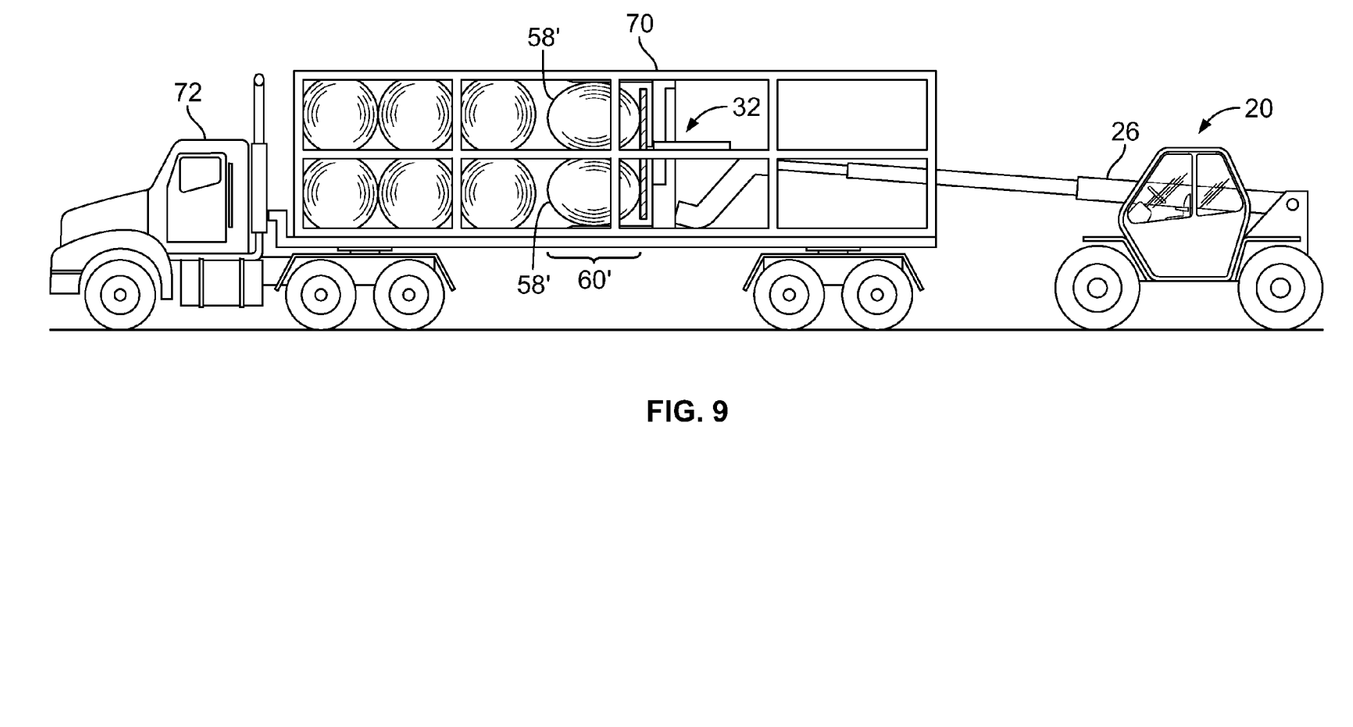
Figure 10:
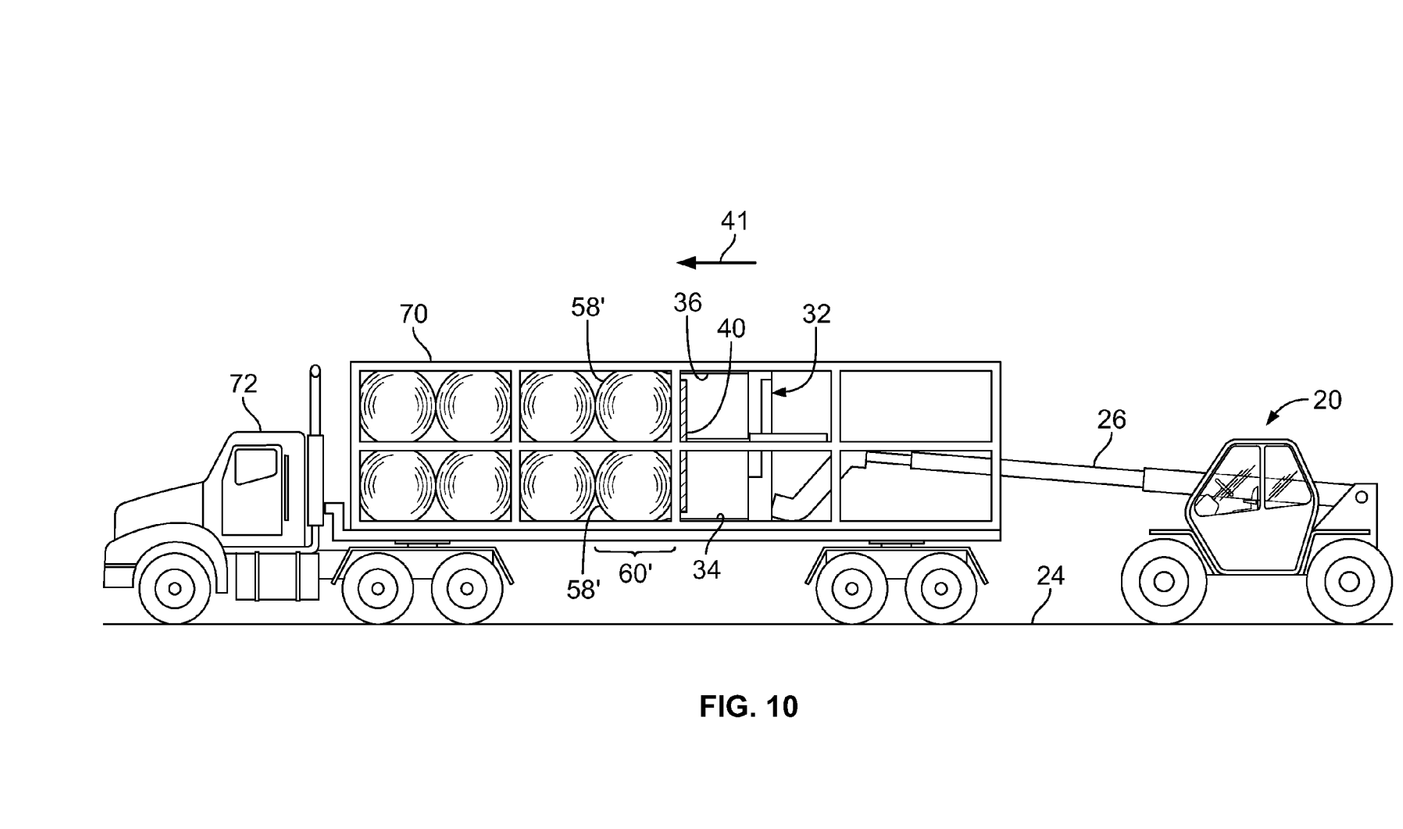

As shown in FIGS. 8-10, work vehicle 20 may be utilized to install a bale pair 60' inside a transport frame 70, such as a trailer, including a semi trailer that is movable by a semi truck 72, which trailer defining an enclosure, access to the enclosure being provided by an opening formed in the enclosure, such as the doors positioned at one end of the trailer (not shown). For clarity, transport frame 70 is shown in FIGS. 8-10 in cutaway view. As further shown in FIG. 8, after laterally surrounding and lifting/manipulating bale pair 60', work vehicle 20 aligns attachment 32 with the opening of transport frame 70 and partially inserts attachment 32 inside the opening. Once attachment 32 has been aligned with the opening of the transport frame, boom 26 is urged toward its extended position, likewise urging bale pair 60' further inside of the transport frame (FIG. 9). Upon sufficient insertion of bale pair 60' inside of the transport frame, push-off device 40 is urged by fluid cylinder 42 in a direction 41 to push bale pair 60' from between opposed forks 34, 36 of the attachment, after which boom 26 may be retracted from the transport frame to continue the loading operation until the transport frame is fully loaded with bale pairs 60'. By virtue of retention forces of one or more bale 58' of bale pair 60' to their respective cylindrical shape, the resulting expansion of the bales 58' in the opposite direction of the applied compressive force help to secure the position of the bales within the transport frame, resulting in at least a reduction of a tendency of the bales to shift within the transport, resulting in a load of bales having increased stability, enhancing safety associated with transportation of the bales.

In order for the loading sequence as shown in FIGS. 8-10 to occur, use of a conventional work vehicle boom construction would have been extremely difficult, in that the angular position of the boom 26 with respect to the ground 24 would need to be continually change as the bale pair 60' is inserted inside the transport frame 70, in order to avoid damage to the roof of the transport frame by forks 36 of the attachment 32. The difficulty of loading under this application is due to a control valve, commonly referred to as a load holding lock valve, provided as a safety feature to prevent an inadvertent change in angular position of the boom, even under a loaded condition and loss of fluid pressure. In other words, an operator would need to continually manipulate the controls of the boom, resembling a sawtooth path that would be extremely stressful and difficult for even an experienced operator to perform, significantly increasing the amount of time to load the bales, and greatly increasing the risk of damage to the associated equipment, effectively rendering such work vehicle as unworkable for the application.

Figure 12:
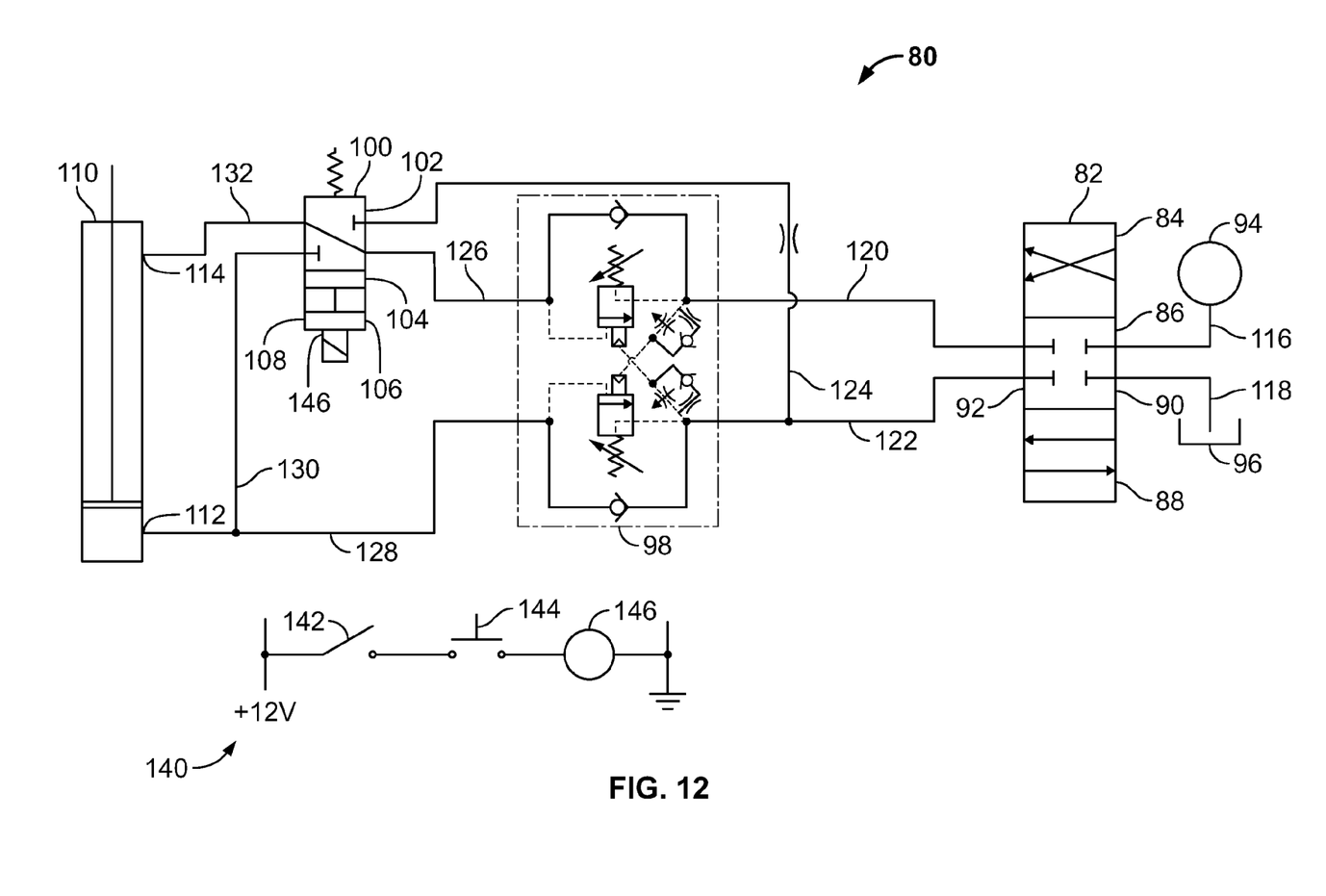
FIG. 12 schematically shows a portion of a fluid circuit and an electrical circuit associated with operation of a boom of the work vehicle of the present invention.

As shown schematically in FIG. 12, a portion of a fluid circuit 80 and an electrical circuit 140 associated with the operation of the boom is shown. Fluid circuit 80 and electrical circuit 140 collectively permit, under the special circumstances described, for the operator to bypass the load holding lock valve, further referred to in the schematic as a second control valve 98, the operation of which is well known and not further discussed herein.

Fluid circuit 80 includes a first control valve 82 having a raising position 84, a neutral position 86 and a lowering position 88. First control valve 82 includes a port or a first side 90 in fluid communication via lines 116 and 118, respectively, with a pressurized fluid source 94 and a reservoir 96, and a port or a second side 92 that is in fluid communication with the rest of the fluid circuit. Second control valve 98 is in fluid communication with second side 92 of first control valve 82 via lines 120 and 122. A third control valve 100, which in one embodiment is a solenoid valve, includes a neutral position 102 and a bypass position 104. One of the positions of the third control valve 100 is selectably in fluid communication with a port or a third side 106 and a port or a fourth side 108. Third side 106 of third control valve 100 is connectable to second control valve 98 via lines 126 and the combination of lines 122 and 124, and selectably connectable to second side 92 of first control valve 82 via combination of lines 124 and the portion of line 122 that is in fluid communication with the first control valve, with fourth side 108 of third control valve 100 being selectably connectable to a first port 112 via lines 130 and 128, and a second port 114 of a fluid cylinder 110 via line 132.

Electrical circuit 140 includes a first operable element 142, such as a limit switch, in series with a second operable element 144, such as a push button that is further in series with a solenoid switch 146 associated with the control of third control valve 100. An operator control (not shown), such as a switch, including, but not limited to any of a mechanical, an electrical, or a hydraulic pilot operated control, may be used to control first control valve 82. In response to actuation of the operator-controlled switch, as first control valve 82 is selectably urged from neutral position 86 toward lowering position 88, first operable element 142 is closed or enabled or actuated with respect to electrical circuit 140. In addition to the enablement or actuation of first operable element 142 toward and ultimately to a closed position, second operable element 144 must also be enabled or actuated by the operator toward and ultimately to a closed position in order to close electrical circuit 140. Upon the closure of electrical circuit 140, solenoid switch 146 is energized, which places third control valve 100 in bypass position 104. Second operable element 144 may be a hand operated control, a foot operated control, or a console mounted control. In one embodiment, second operable element 144 may be a temporary switch, requiring continuous actuation by the operator to maintain the second operable element in an engaged position, thereby maintaining electrical circuit 140 in a closed position.

In response to the combination of closing of electrical circuit 140 and first control valve 82 being selectably urged or placed in lowering position 88, third control valve 100 is actuated to bypass position 104, and placing fluid circuit 80 in bypass mode. In bypass mode, reservoir 96, first port 112 and second port 114 of fluid cylinder 110 are brought into mutual fluid communication, bypassing second control valve 98, which permits boom 26 to be angularly lowered, such as toward the floor of transport frame 70. In other words, as a result of fluid circuit 80 being placed in bypass mode, the fluid pressure in the first and second ports 112, 114 of fluid cylinder 110 are equalized and fluid is directed to reservoir 96, permitting forks 34, as shown in FIG. 10, to rest on the floor of transport frame 70, permitting extension of boom 26 to smoothly occur (the portion of the fluid circuit associated with extension/retraction of boom 26 not shown). Upon attachment 32 being sufficiently inserted inside of transport frame 70, push-off bar 40 may be actuated to separate bail pair 60' from the attachment. Retraction of boom 26 while operating in bypass mode of fluid circuit 80 permits boom retraction with forks 34 continuing to remain in contact with floor 34 of transport frame 70, gradually increasing the angle of the boom with respect to the ground, until the attachment has been sufficiently retracted from the opening of the transport frame for the operator to remove fluid circuit 80 from bypass mode.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A work vehicle comprising:
   a telescoping boom extending outwardly from the vehicle;
   an attachment operably connected to the boom, the attachment including opposed forks configured to be both urgable toward each other and urgable away from each other;
   the attachment configured to be positionable over and substantially laterally surround at least one pair of round bales arranged substantially side by side and having corresponding diameters in close proximity of each other, the opposed forks being urgable toward each other with sufficient compressive force applied to opposed portions of the diameters of the at least one pair of round bales, at least elastically deforming the cylindrical profile of at least one of the at least one pair of round bales, so that the at least one pair of round bales can be vertically lifted and manipulated by at least the boom to a predetermined destination; and an actuator configured to move the forks between at least a first gripping position and a second loading position. wherein in a gripping position two generally facing gripping surfaces of the forks are positioned closer to one another than in the loading position.

2. The work vehicle of claim 1, wherein the attachment is configured to be positioned over and lowered to substantially laterally surround the at least one pair of round bales.

3. The work vehicle of claim 1, wherein the attachment is rotatable at least 90 degrees with respect to the boom.

4. The work vehicle of claim 1, wherein the attachment includes a push-off device including a second actuator and configured for impacting at least one transported bale located between the forks.

5. The work vehicle of claim 4, wherein the push-off device is configured to move in a direction substantially perpendicular to the direction of the forks.

6. The work vehicle of claim 5, wherein the push-off device is positioned between the opposed sets of forks and movable respect to the forks.

7. The work vehicle of claim 6, wherein the attachment includes a base frame extending to a fork of the opposed forks, a carrier extending to forks defining the remainder of the opposed forks, the base frame and the carrier movable with respect to each other for varying lateral positioning of the forks.

8. The work vehicle of claim 1, wherein the predetermined destination is a transport frame defining an enclosure, access to the enclosure is provided by an opening formed in the enclosure.

9. The work vehicle of claim 8, wherein the opening is a door positioned at one end of the trailer.

10. The work vehicle of claim 1, wherein the work vehicle includes a fluid circuit associated with the boom comprising at least a first, second and third control valve, the first control valve comprising at least a raising position, a neutral position and lowering position, with one of the sides of the first control valve connectable to a source of pressurized fluid and to a reservoir the second control valve configured to retain the boom in a fixed position when the fluid circuit is not in a bypass mode;

the third control valve comprising at least a neutral position and a bypass position, selectable in fluid communication with the second control valve and first and second ports of a cylinder controlling the boom position wherein in response to a condition of an electrical circuit and the first control valve being selectably urged to the lowering position, the third control valve is actuated to the bypass position, the fluid circuit being placed in the bypass mode, a reservoir and the first port and the second port of the fluid cylinder being in fluid communication via the bypass position of the third control valve, bypassing the second control valve, permitting the boom to be lowered.

11. The work vehicle of claim 10, wherein in the bypass mode, the reservoir, first port and second port of the cylinder are in mutual fluid communication, bypassing the second control valve.

12. A work vehicle comprising:

a telescoping boom extending outwardly from the vehicle;

an attachment operably connected to the boom, the attachment including opposed forks configured to be both unable toward each other and urgable away from each other;

the attachment configured to be positionable over and substantially laterally surround at least one pair of round bales arranged substantially side by side and having corresponding diameters in close proximity of each other, the opposed forks being urgable toward each other with sufficient compressive force applied to opposed portions of the diameters of the at least one pair of round bales, at least elastically deforming the cylindrical profile of at least one of the at least one pair of round bales, so that the at least one pair of round bales can be vertically lifted and manipulated by at least the boom to a predetermined destination;

wherein the redetermined destination is a trans ort frame defining an enclosure, access to the enclosure is provided by an opening formed in the enclosure;

wherein the work vehicle includes a fluid circuit associated with the boom that permits the attachment to be inserted inside the trailer by the boom is while the attachment maintains contact with a floor of the trailer;

wherein the fluid circuit includes a first control valve comprising at least a raising position, a neutral position and a lowering position, with one of the positions of the first control valve being selectably in fluid communication with a first side and a second side, the first side of the first control valve connectable to a source of pressurized fluid and to a reservoir;

a second control valve in fluid communication with the second side of the first control valve, the second control valve configured to retain the boom in a fixed position when the fluid circuit is not in a bypass mode;

a third control valve in fluid communication with the fluid circuit, the third control valve comprising at least a neutral position and a bypass position, with one of the positions of the third control valve being selectably in fluid communication with a third side and a fourth side, the third side of the third control valve connectable to the second control valve and selectably connectable to the second side of the first control valve, the fourth side of the third control valve being selectably connectable to a first port and a second port of a fluid cylinder, the first port and the second port of the fluid cylinder being selectably connectable to the second side of the first control valve;

an electrical circuit selectably connectable with the third control valve to control the third control valve when the electrical circuit is closed;

in response to the electrical circuit being closed and the first control valve being selectably urged to the lowering position, the third control valve is actuated to the bypass position, the fluid circuit being placed in the bypass mode, the reservoir and the first port and the second port of the fluid cylinder being in fluid communication via the bypass position of the third control valve, bypassing the second control valve, permitting the boom to be angularly lowered toward a surface.

13. A work vehicle comprising:

a telescoping boom extending outwardly from the vehicle;

a fluid circuit associated with the boom;
an attachment operably connected to the boom, the attachment including opposed forks configured to be both urgable toward each other and urgable away from each other;
the attachment configured to be positionable over and substantially laterally surround at least one pair of round bales arranged substantially side by side and having corresponding diameters in close proximity of each other, the opposed forks being urgable toward each other with sufficient compressive force applied to opposed portions of the diameters of the at least one pair of round bales;
wherein the fluid circuit includes a first control valve comprising at least a raising position, a neutral position and a lowering position, with one of the positions of the first control valve being selectably in fluid communication with a first side and a second side, the first side of the first control valve connectable to a source of pressurized fluid and to a reservoir;
a second control valve in fluid communication with the second side of the first control valve, the second control valve configured to retain the boom in a fixed position when the fluid circuit is not in a bypass mode;
a third control valve in fluid communication with the fluid circuit, the third control valve comprising at least a neutral position and a bypass position, with one of the positions of the third control valve being selectably in fluid communication with a third side and a fourth side, the third side of the third control valve connectable to the second control valve and selectably connectable to the second side of the first control valve, the fourth side of the third control valve being selectably connectable to a first port and a second port of a fluid cylinder, the first port and the second port of the fluid cylinder being selectably connectable to the second side of the first control valve;
an electrical circuit selectably connectable with the third control valve to control the third control valve when the electrical circuit is closed;
in response to the electrical circuit being closed and the first control valve being selectably urged to the lowering position, the third control valve is actuated to the bypass position, the fluid circuit being placed in the bypass mode, the reservoir and the first port and the second port of the fluid cylinder being in fluid communication via the bypass position of the third control valve, bypassing the second control valve.

* * * * *